United States Patent [19]
Reeves

[11] Patent Number: 5,137,142
[45] Date of Patent: Aug. 11, 1992

[54] LOW MASS TRANSPORT SHAFT
[75] Inventor: Richard E. Reeves, Webster, N.Y.
[73] Assignee: Xerox Corporation, Stamford, Conn.
[21] Appl. No.: 622,399
[22] Filed: Dec. 3, 1990

Related U.S. Application Data
[63] Continuation of Ser. No. 393,444, Aug. 14, 1989, abandoned.

[51] Int. Cl.⁵ .............................................. B65G 13/02
[52] U.S. Cl. ........................................ 198/780; 193/37
[58] Field of Search ................ 198/780; 193/35 R, 37

[56] References Cited
U.S. PATENT DOCUMENTS

| | | | |
|---|---|---|---|
| 1,744,914 | 1/1930 | Moore | 198/780 |
| 1,909,500 | 5/1933 | Ornitz | 474/903 X |
| 3,408,829 | 11/1968 | Gage | 464/162 |
| 3,808,658 | 5/1974 | Looney | 29/110 |
| 3,815,380 | 6/1974 | Esmay | 403/349 X |
| 4,568,312 | 2/1986 | Geisthoff | 464/162 |
| 4,622,022 | 11/1986 | Diffenderfer et al. | 464/162 |
| 4,706,801 | 11/1987 | Vessey | 198/789 X |

Primary Examiner—Joseph E. Valenza

[57] ABSTRACT

A low mass transport shaft is formed by crimping a thin wall tube to form two opposed grooves along the length of the shaft. The two grooves impart rigidity to the tube structure enabling it to be used for such purposes as a paper transport shaft. In the embodiment shown, a pair of feed rollers are rigidly attached along predetermined points on the shaft, the rollers rotate with the shaft, and serve to move objects in contact therewith such as paper along a predetermined path.

4 Claims, 2 Drawing Sheets

LOW MASS TRANSPORT SHAFT

This is a continuation of application Ser. No. 07/393,444, filed Aug. 14, 1989 abandoned.

BACKGROUND AND PRIOR ART STATEMENT

This invention relates to a shaft for conveying an article along a path of travel and, more particularly, to a thin walled tubing shaft having a low mass and yet having structural rigidity.

There are numerous applications requiring that paper or some other article be moved along a path by rollers mounted on a rotating shaft. A typical paper transport comprises a solid cylindrical bar having machine flats and retainer grooves and drilled cross holes for locating and securing feed rolls to the shaft surface. Some examples of prior art drive shafts are found in U.S. Pat. Nos. 3,808,658, 3815,380, 4,568,312, and 4,622,022. It would be desirable to reduce the mass of the prior art shaft assemblies thereby reducing the adverse effects of overcoming inertia, lessening power requirements to drive the shaft, and reducing tooling and part costs. Reduction of the shaft mass, however, must be accomplished without sacrificing the structural rigidity required for the shaft to perform its functions.

The present invention realizes these goals by providing a hollow thin wall shaft which has a pair of grooves extending along its length. The grooves are deep enough, and wide enough to impart structural rigidity to the tube. Rollers are aligned along the length and secured in place by such grooves and screws which lock into the grooves. More particularly, the invention is directed towards a shaft assembly adapted to transport objects across a surface thereof, said assembly comprising an elongated thin wall tube; said tube having a pair of diametrically opposed grooves formed along its length; said assembly further comprising at least two roller members rigidly secured at predetermined positions along the shaft, said shaft adapted to be rotatably driven at one end so as to impart rotational motion to said roller members carrying objects thereon to be conveyed in the direction of motion.

DESCRIPTION OF THE INVENTION

Figure 1:
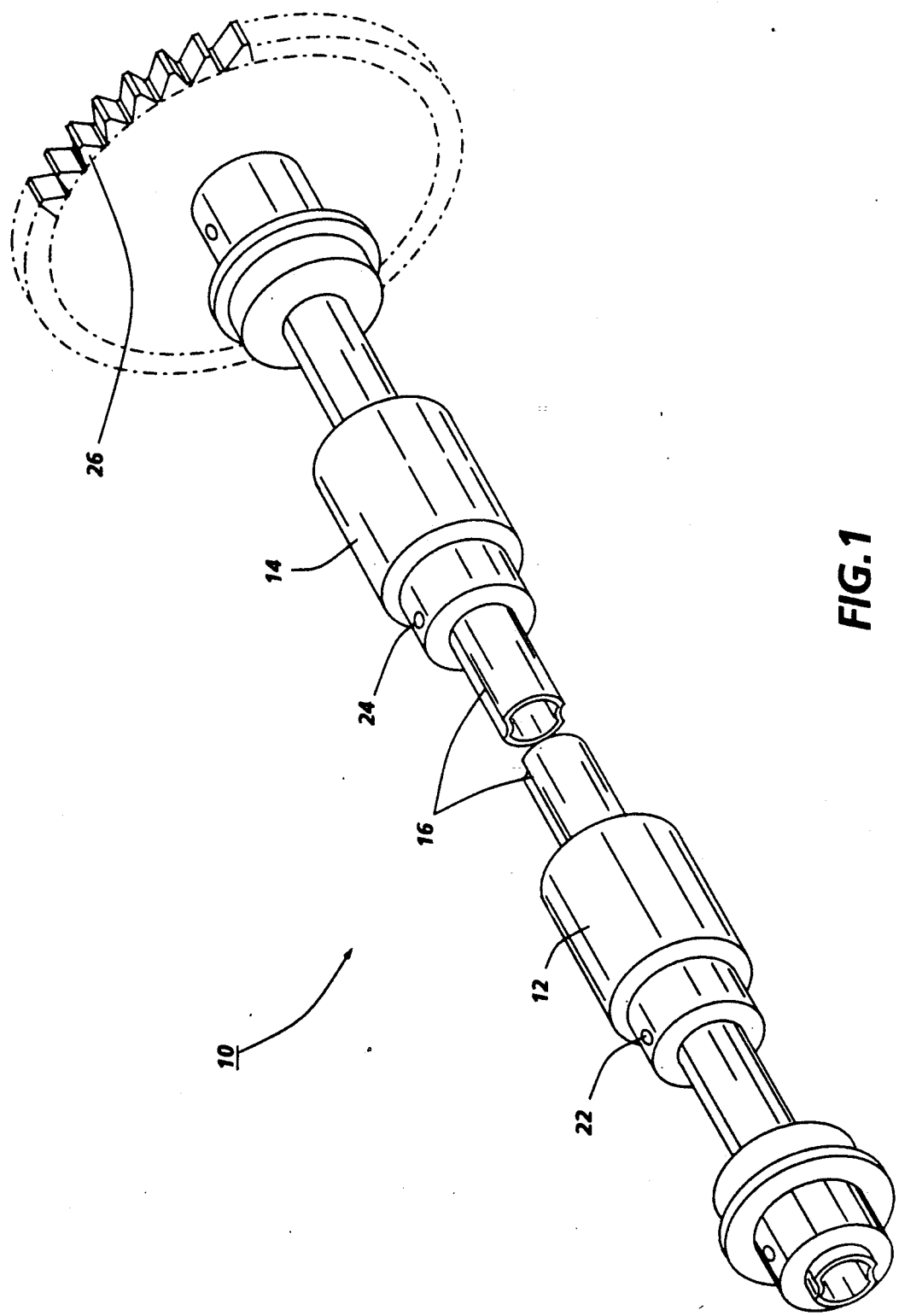
FIG. 1 is an isometric view of the low mass shaft of the present invention having a plurality of conveyor rolls mounted along its length.
Figure 2:
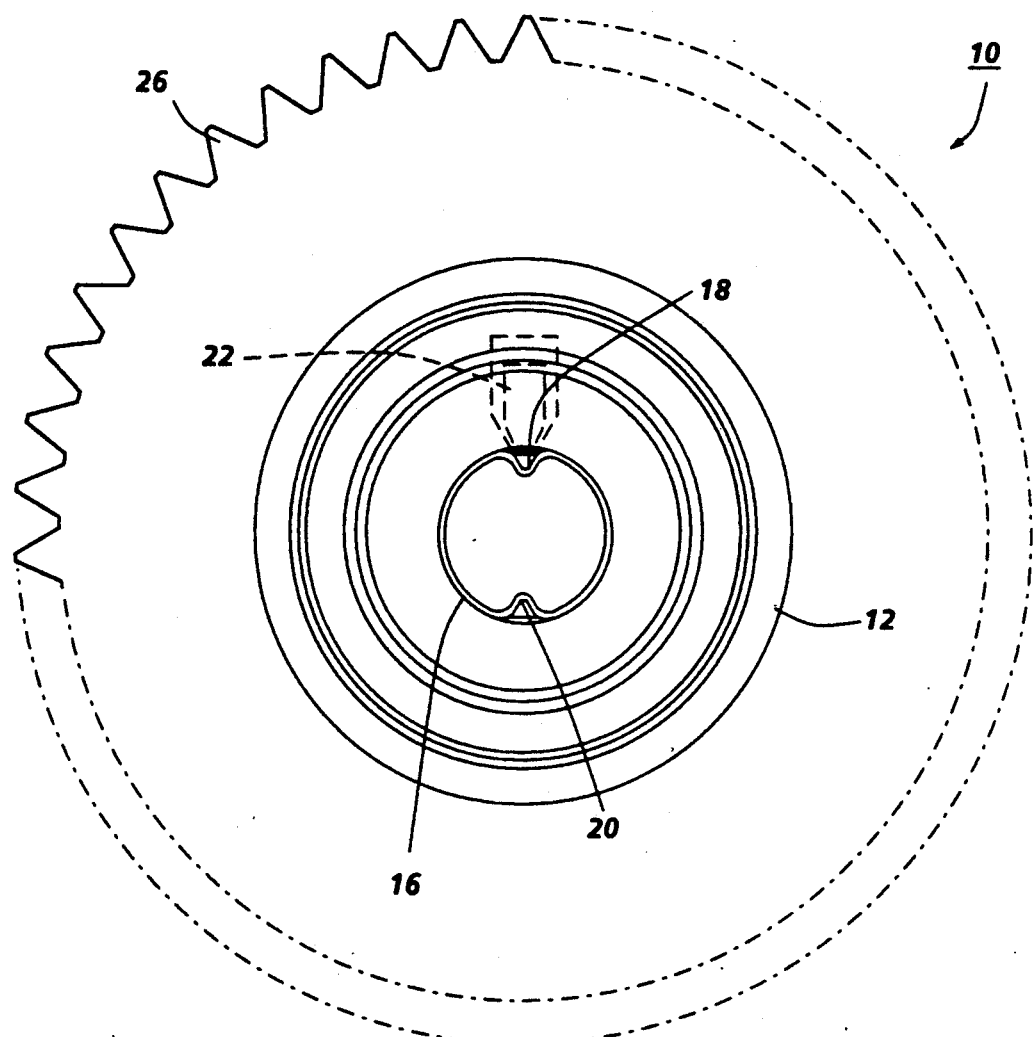
FIG. 2 is a side view of the shaft of FIG. 1.

Referring now to the drawings, there is shown in FIGS. 1 and 2, a shaft transport assembly 10 having rollers 12, 14 axially mounted along the length of shaft 16. Shaft 16 is a hollow, thin wall tube having a pair of grooves 18, 20 formed along its length. Rollers 12, 14 can serve, for example, as feed rollers in a zerographic copier for feeding paper sheets from a stack to an image transfer zone. As a second example, the feed rollers can have entrained about their circumference, conveyor belts which transport moving particles such as paper copy sheets along a path of travel. Rollers 12, 14 are secured in position along the shaft by means of screws 22, 24, respectively. Each of the roller scan be positioned along any portion of the shaft 16; more or less than two rollers shown can be employed. One end of the shaft has affixed thereto a gear member 26 which can mesh with another gear or with a power source to provide the energy to rotate the shaft. The other end of the shaft is adapted to couple with suitable mounting means. The shaft could also be used as an idler shaft dispensing with the need for a driving end.

Figure 3:
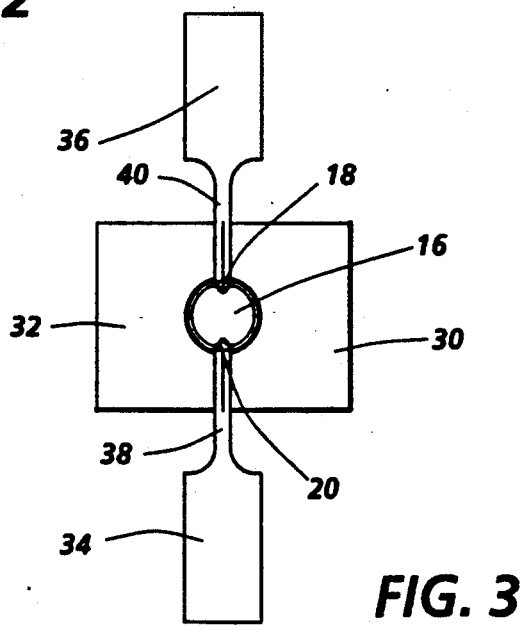
FIG. 3 shows a side view of of a manufacturing set up for crimping a hollow shaft to create grooves for imparting structural strength to the shaft.

FIG. 3 shows a side view of a manufacturing method for forming grooves 18 and 20 along the length of shaft 16. As shown, a four slide fixture is used. Rigidly mounted slides 30 and 32 have a length equal to the shaft being worked on. Each slide 30, 32 has a semicircular cutout at the opposed faces, the cutouts accommodating the curvature of shaft 16. Movable slides 34, 36 have a tapered finger segment 38, 40, respectively. Slides 34, 36 are moved towards each other depressing the thin wall shaft inwards, thereby forming grooves 18 and 20. The grooves provide the rigidity necessary to accomplished the function described in connection with the shaft assembly rotation. In a preferred embodiment, shaft 16 is comprised of steel having walls 1 mm thick. Grooves 18 and 20 are formed to extend 2-3 mm into the interior of the shaft and have a width of 2-3 mm (dependent on shaft diameter). Such a shaft assembly will have relatively less mass and lower inertial requirements to overcome, and is simple to manufacture.

While the invention has been described with reference to the structure disclosed, it is not confined to the specific details set forth, but is intended to cover other modifications and changes, for example, the shaft transport may find other applications besides that of paper transport. Any such changes are intended to come within the scope of the following claims.

I claim:

1. A shaft assembly adapted to transport objects across a surface thereof, said assembly comprising an elongated thin walled hollow tube; said tube having a pair of diametrically opposed grooves formed along its length, said grooves increasing the structural rigidity of said tube, said assembly further comprising at least two roller members rigidly secured at predetermined positions along the tube, said tube adapted to be rotatably driven at one end so as to impart rotational motion to said roller members carrying objects thereon to be conveyed in the direction of motion.

2. A shaft assembly according to claim 1 further including securing members connected to said roller members and adapted to be securely fixed with said grooves so as to maintain the roller members in a fixed position.

3. A shaft assembly comprising a thin-walled hollow tube having a pair of diametrically opposed grooves extending along its length, said grooves increasing the structural rigidity of said tube, and further including a plurality of roller members rigidly secured to said tube along points within said groove.

4. The shaft assembly of claim 1, wherein the depth and width of said grooves are approximately equal.

* * * * *